Figure 1:
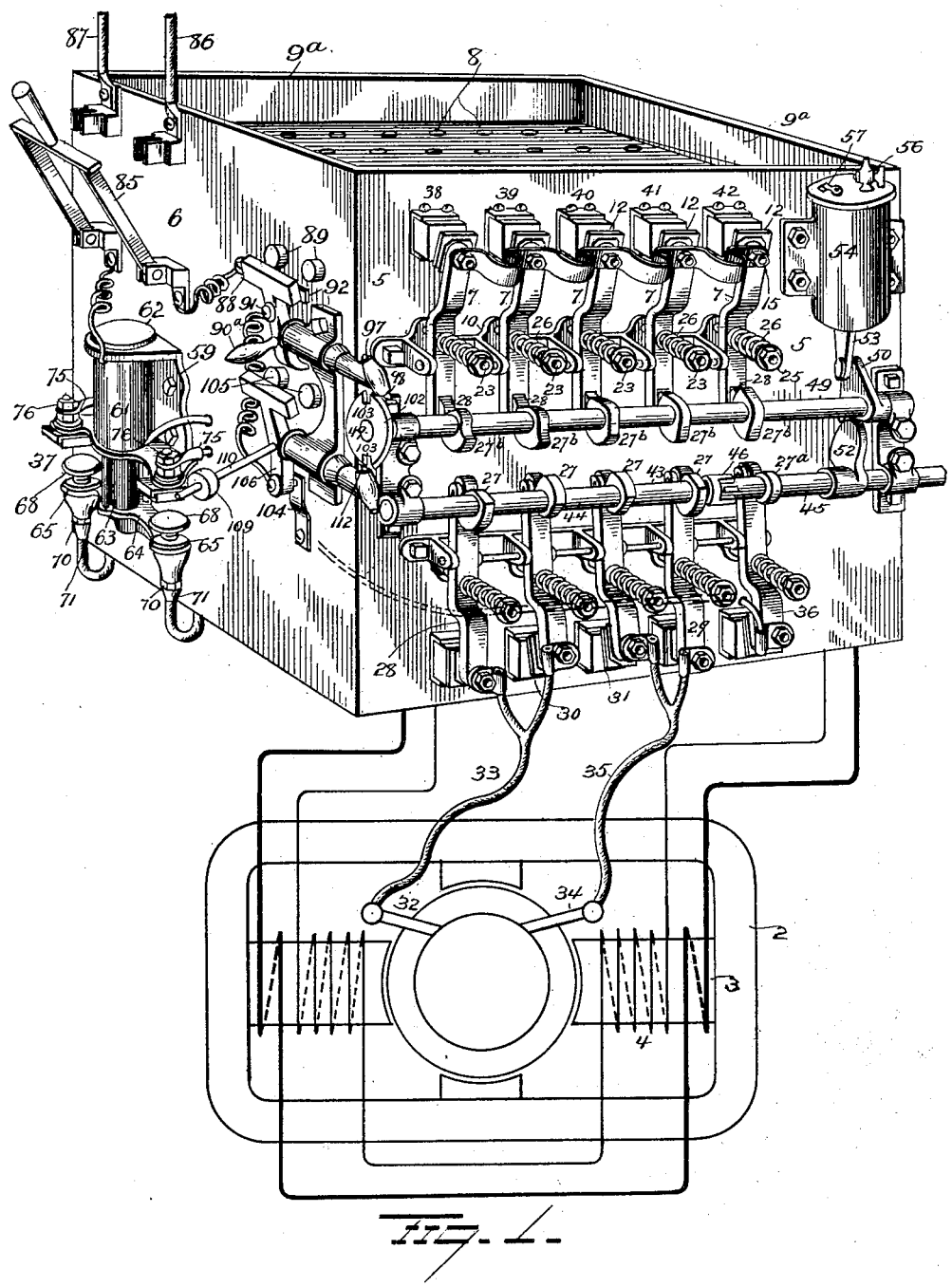

No. 731,375. PATENTED JUNE 16, 1903.
W. K. LIGGETT.
ELECTRIC CONTROLLER FOR ELECTRIC MOTORS.
APPLICATION FILED DEC. 22, 1902.
NO MODEL. 5 SHEETS—SHEET 1.

WITNESSES
E. J. Nottingham
G. F. Downing

INVENTOR
W. K. Liggett
By H. A. Seymour
Attorney

No. 731,375. PATENTED JUNE 16, 1903.
W. K. LIGGETT.
ELECTRIC CONTROLLER FOR ELECTRIC MOTORS.
APPLICATION FILED DEC. 22, 1902.
NO MODEL. 5 SHEETS—SHEET 2.
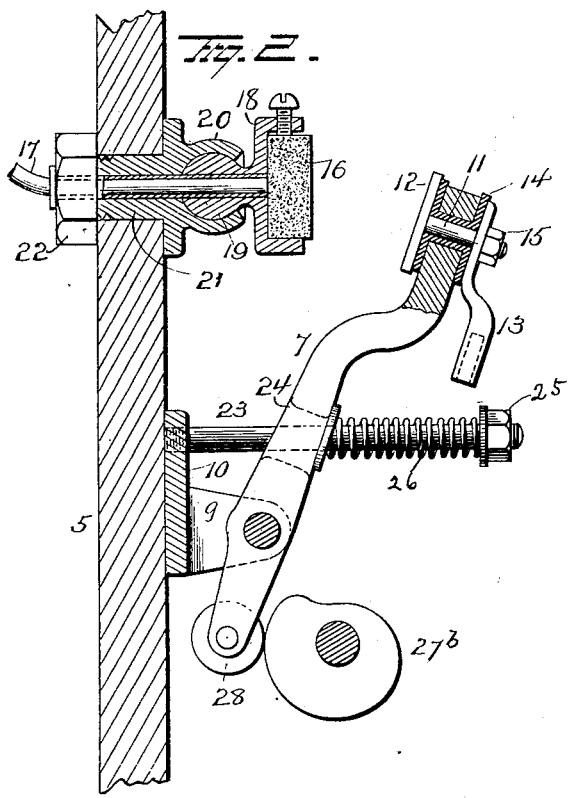
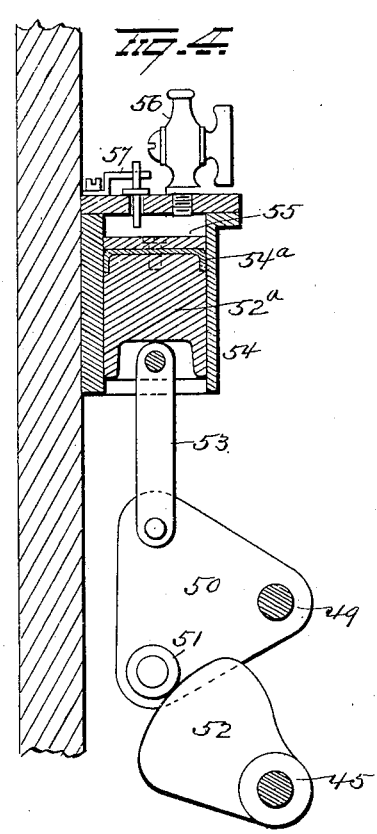
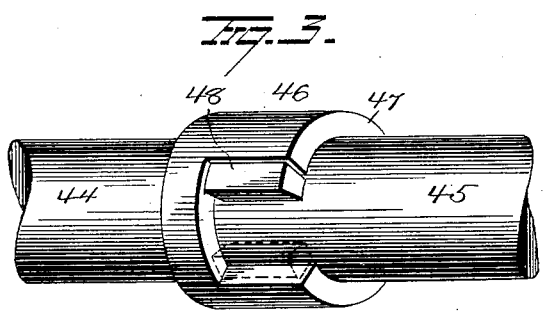
WITNESSES
E. Nottingham
G. F. Downing
INVENTOR
W. K. Liggett
By H. A. Seymour
Attorney No. 731,375. PATENTED JUNE 16, 1903.
W. K. LIGGETT.
ELECTRIC CONTROLLER FOR ELECTRIC MOTORS.
APPLICATION FILED DEC. 22, 1902.
NO MODEL. 5 SHEETS—SHEET 3.
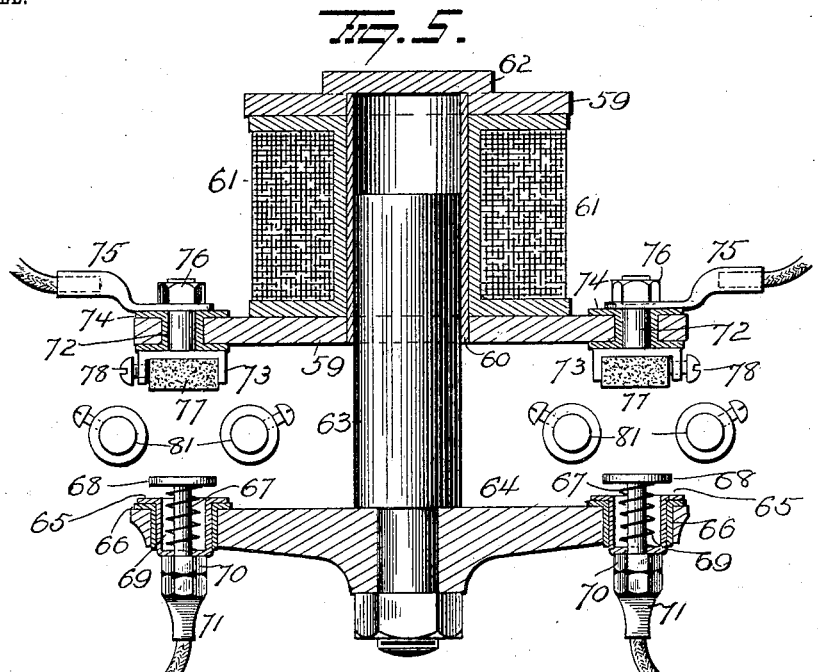
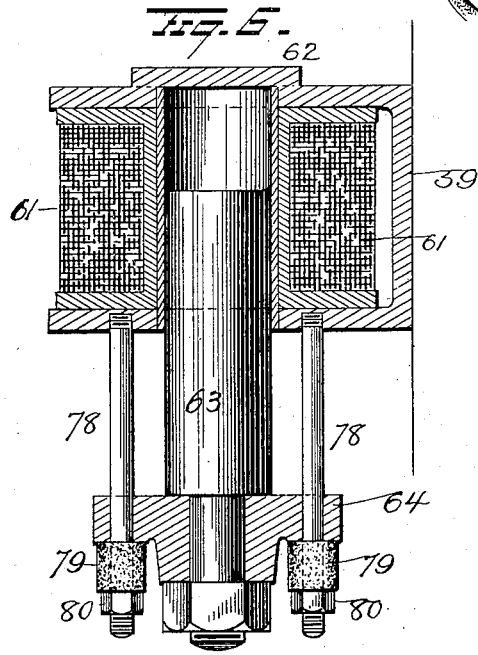
WITNESSES
INVENTOR

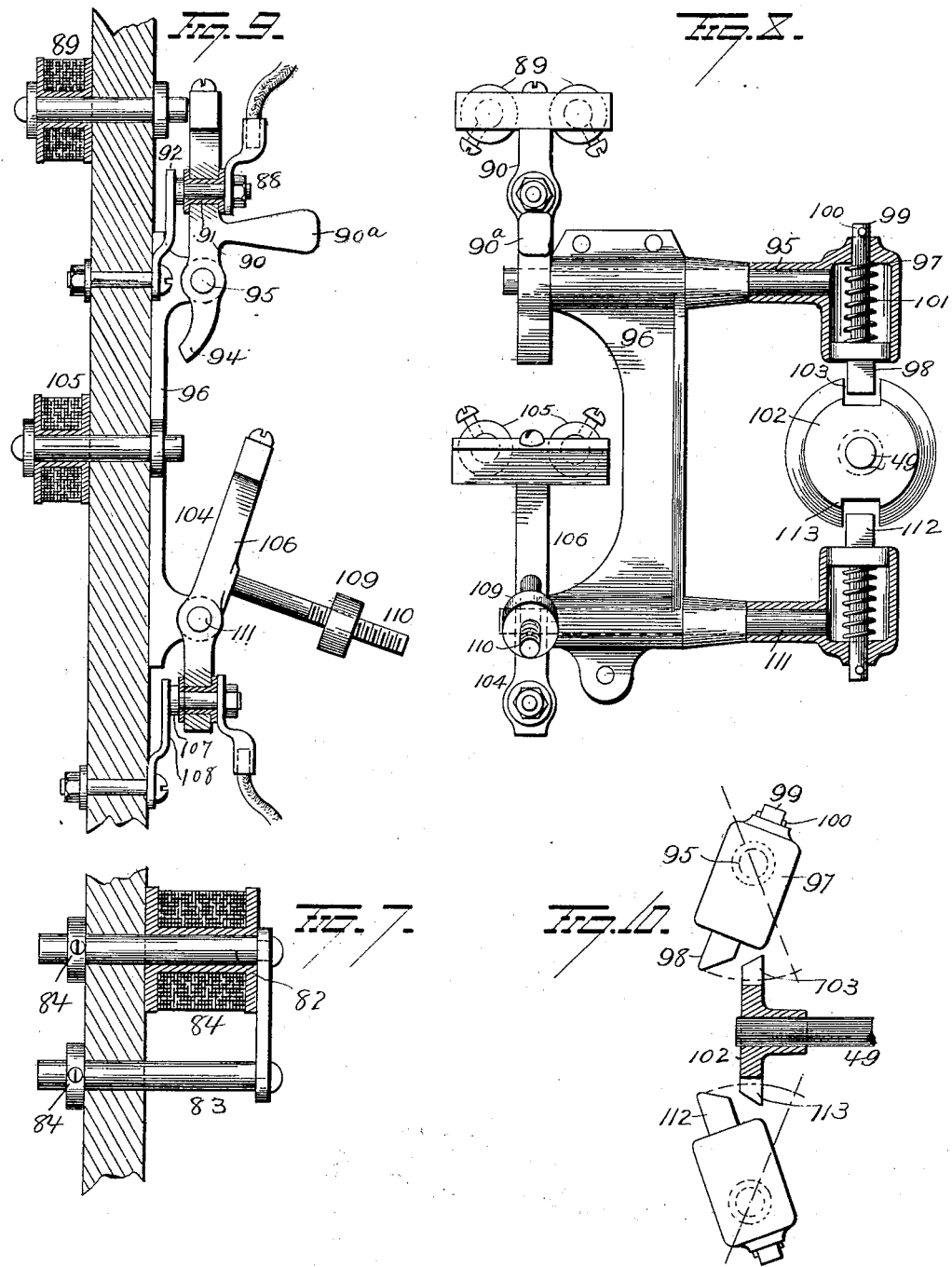

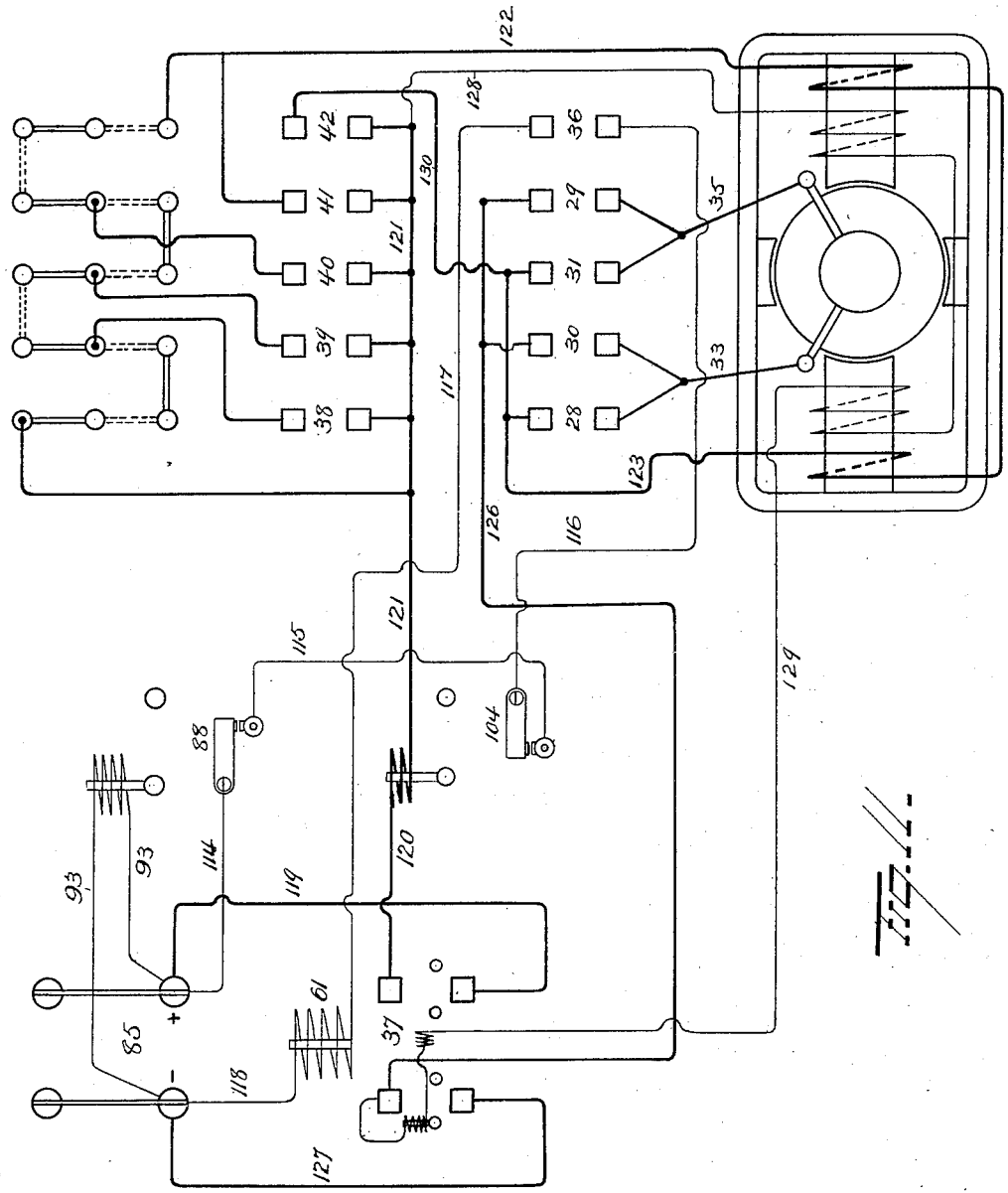

No. 731,375. Patented June 16, 1903.

UNITED STATES PATENT OFFICE.

WILLIAM K. LIGGETT, OF COLUMBUS, OHIO, ASSIGNOR TO THE KINKADE & LIGGETT COMPANY, OF COLUMBUS, OHIO.

ELECTRIC CONTROLLER FOR ELECTRIC MOTORS.

SPECIFICATION forming part of Letters Patent No. 731,375, dated June 16, 1903.

Application filed December 22, 1902. Serial No. 136,261. (No model.)

*To all whom it may concern:*

Be it known that I, WILLIAM K. LIGGETT, of Columbus, in the county of Franklin and State of Ohio, have invented certain new and useful Improvements in Electric Controllers for Electric Motors; and I do hereby declare the following to be a full, clear, and exact description of the invention, such as will enable others skilled in the art to which it appertains to make and use the same.

My invention relates to improvements in electric controllers for electric motors, and particularly adapted for controlling motors required to be started, stopped, and reversed frequently, notably those used for elevator service. Heretofore it has been customary to make such controllers with numerous sliding, rolling, or knife-edge contacts, which require constant attention to prevent them from burning and sticking, or they have been made with a complicated system of electromagnets for their operation, thus very much increasing the danger of burning out and other troubles attending the use of such devices.

One object of my invention is to provide a simple mechanically-operated controller which shall be free from all sliding movements in the current-carrying parts and which shall have these parts so formed as to reduce the burning to a minimum and make it next to impossible for them to stick or weld into each other.

A further object is to provide simple and efficient means for reversing switches before the circuit through the apparatus is closed and also for insuring the opening of the main circuit before said circuit can be broken by the opening of said switches.

A further object is to so construct a controller for electric motors that the circuit through the same will be closed after the closing of the reversing-switch and so that switches of the rheostat will be automatically closed successively after the reversing-switch and the switches which control the passage of current through the apparatus shall have been closed.

A further object is to construct a controller of the class above specified that after the reversing-switch and the switch which controls the passage of current shall have been successively closed the rheostat-switches will be successively closed automatically and gradually to cut out resistance and so that subsequently a switch shall be automatically closed to cut out a portion of the field-winding of the motor.

A further object is to provide an electric controller with simple and efficient means constructed and adapted to operate automatically to open the circuit through the apparatus should the current on the main line fail from any cause.

A further object is to provide means for preventing the operation of the controller if the various switches are not in their proper normal positions.

A further object is to provide an electric controller with means constructed and adapted to operate automatically to open the circuit through the apparatus in case the current becomes excessive.

A further object is to provide switches constructed and adapted to open the circuit through the apparatus in case of failure of the main current or in case of excessive current and to provide means for locking these switches open and maintaining them (or either of them) so locked until the switches which control the passage and direction of the current through the motor and the switches of the rheostat shall have been moved to their proper normal starting position.

A further object is to provide an electrical controller which shall be simple in construction and easy to keep in order and which shall be effectual in all respects in the performance of all the functions required of it.

With these objects in view the invention consists in certain novel features of construction and combinations of parts, as hereinafter set forth, and pointed out in the claims.

In the accompanying drawings, Figure 1 is an oblique projection illustrating my invention applied to a compound-wound reversible motor. Fig. 2 is a detail view, partly in section, illustrating one of the cam-operated switches. Fig. 3 is an enlarged detail view illustrating the coupling between the parts of the shaft. Fig. 4 is an enlarged detail view of the devices for driving the shaft which carries the cams for operating the rheostat-switches. Fig. 5 is a view in cross-section through the main contact-switch. Fig. 6 is a transverse section taken at right angles to Fig. 5. Fig. 7 is a sectional view illustrating the blow-out magnet. Fig. 8 is a detail view of the "no-voltage" and "overload" switches and their locking devices. Fig. 9 is a view taken at right angles to Fig. 8. Fig. 10 is a detail sectional view of the locking devices for said switches. Fig. 11 is a diagrammatical view illustrating the circuits.

1 represents my improved controller, and 2 an electric motor of the compound-wound type, having a series winding 3 and a shunt-winding 4, and these windings are connected with the controller-circuits, as hereinafter explained.

The controller comprises two switchboards 5 and 6, and these constitute two sides of a box containing a number of coils 8 of resistance-wire. The sides 9ª 9ª of said box are preferably made of iron, while the sides 5 6, on which the switch devices are located, may be made of slate or other non-conducting material. The switches on the board 5 are mechanically driven and so arranged as to be under the control of an operator for effecting the starting, stopping, or reversing of the motor and throwing resistance into and out of the circuit, while the switches on the board 6 (with the exception of the knife-edge switch at the leading-in terminals) are electrically actuated and more or less controlled by the operation of switches on the board 5. The mechanically-operated switches on the board 5, though differing in electrical functions, are identical in construction, and hence a detail description of one of them will suffice for all.

In constructing each switch on the board 5 I employ an arm or lever 7, pivotally supported near one end in a bracket 9, projecting from a base-plate 10, secured to the board 5. The arm or lever 7 is perforated near one end for the passage of the stem 11 of a copper or brass contact-piece 12, disposed under the end of the arm or lever. A connector 13 is placed on the stem 11 and the contact-piece 12. Its stem 11 and connector 13 are electrically separated from the arm or lever by means of insulating material 14. The free end of the stem 11 is screw-threaded for the reception of a nut 15, by means of which the contact-piece and its coacting parts are rigidly secured in place. The other side of the switch consists of a carbon contact-block 16, with which a conductor 17 is electrically connected. This contact-block is secured in a holder 18, and the latter is provided with a spherical enlargement 19, seated in a similarly-shaped portion of a socket-piece 20. The socket-piece 20 is provided with a shank 21, which passes through the board 5 and threaded at its end to receive a nut 22. The holder 18, enlargement 19, and shank 21 are made with alined perforations for the passage of the conductor. From this construction it will be seen that the contact-block 16 will readily adjust itself relatively to the contact-piece 12 when the latter is pressed against it, and thus insure a good electrical contact between the parts 12 and 16. A rod 23 is secured to the base-plate 10 and passes loosely through a hole 24 in the switch arm or lever 7 and threaded at its outer end for the reception of a nut 25, between which and the switch arm or lever a coiled spring 26 encircles the rod and tends normally to move the contact-piece 12, carried by the switch-arm, toward the carbon contact-block 16, the tension of said spring being readily adjustable by means of the nut 25. The movement of the switch-lever by the spring to close the contacts 12 16 is resisted and controlled by a cam 27, acting on a roller 28, carried by the short arm of the switch-lever. It will be seen that by means of the cam 27 the switch-lever may be permitted by the action of the spring 26 to turn on its fulcrum to bring the contact-piece 12 into engagement with the contact-block 16 to close an electric circuit including these contact devices, or said cam may be turned to positively rock the switch-lever in the reverse direction to open such circuit.

In Fig. 1 of the drawings two rows of switches, such as above described in detail, are shown on the board 5. Of these the switches 28 29 and 30 31 constitute a reversing-switch, the connectors 13 of the switches 28 and 30 being connected with one commutator-brush 32 of the motor by a conductor 33, and the connectors 13 of the switches 29 and 31 being connected with the other commutator-brush 34 by a conductor 35, while the contact-blocks 16 of these switches are connected in circuit, as hereinafter more fully explained. The switch 36 of the lower row constitutes a pilot-switch for closing the circuit of a main switch 37 on the board 6. The switches 38, 39, 40, and 41 of the upper row constitute the rheostat-switches, and the switch 42 is for short-circuiting a portion (the series coils) of the field-winding of the motor to increase the speed of the motor after all the resistance shall have been cut out.

It is important that the switches on the board 5 shall operate in certain regular order, so as to prevent the opening of the switch carrying current to the motor until the circuit including said switches shall have been first opened. To operate the said switches and accomplish the result above stated, the devices now to be described are employed. A shaft 43 is mounted in suitable bearing on the board 5 and is provided with any suitable device whereby the operator can manipulate it. This shaft comprises two parts 44 45, arranged in alinement with each other and connected by a coupling 46. This coupling comprises a sleeve 47, secured to the section 44 of the shaft and arranged to constitute a bearing in which the end of section 45 of the shaft can turn, and a pin 48, secured to the section 45 of the shaft and adapted to limit the movement of the section 45 independently of the section 44 an extent equal to the width of a slot or recess 49 in the sleeve 47, in which slot or recess the pin 48 moves. The section 45 of shaft 43 carries a cam 27$^a$, operating the pilot-switch 36, by means of which the main switch 37 is controlled, and the section 44 of said shaft carries cams 27 for operating the reversing-switches. The sole office of the section 44 of the shaft 43 is to control the movements of the reversing-switches, and since it is desirable that these switches be closed before the main circuit through the machine is closed and not opened until after the main circuit has been broken the coupling between the sections 44 45 of shaft 43, above described, is employed to provide a certain amount of lost motion between said sections 44 45. The cams on the section 44 of the shaft are so shaped and arranged that these switches move in pairs, preferably the switches 28 29 opening while the switches 30 31 close, and vice versa, so that the current may be reversed in the armature of the motor. The section 45 of the shaft on moving past the center will operate to close one pair of these switches (the other pair being open) just before the cam 27$^a$ on shaft-section 45 closes the pilot-switch 36 and upon returning the shaft-section 45 to the center will not move either pair of reverse-switches; but a return movement of the shaft-section 45 past the center of its movement will reverse the positions of the reversing-switches, and thus reverse the direction of current through the armature of the motor. The same movement of the shaft-section 45 controls the operation of the rheostat-switches to throw resistance into and out of circuit. The devices by which these results are accomplished will now be explained.

A shaft 49 is mounted in suitable bearings secured to the board 5, said shaft being located above the two-part shaft 43 and in close proximity to the lower ends of the switches 38 42. The shaft 49 carries a series of cams 27$^b$, so arranged on the shaft as to operate to close the several switches successively when said shaft is turned. A wrist-plate 50 is also secured to the shaft 49 and provided with a roller 51, which constitutes, in effect, a wrist-pin. A cam 52 is secured to the section 45 of the two-part shaft 43 and is adapted to engage the roller or wrist-pin 51 on the wrist-plate 50 for the purpose of driving the shaft 49 in one direction. The wrist-plate 50 (and consequently the shaft to which it is secured) is driven in the reverse direction by the weight of the piston 52$^a$ and piston-rod 53 of a dash-pot 54, connected with said wrist-plate, when the cam 52 shall have been moved out of the path of the roller 51. The cylinder of the dash-pot is secured to the board 5 above the shaft 49, and the piston 52$^a$ is provided with suitable packing 54$^a$, held in place by a plate 55. The speed of the downward movement of the piston of the dash-pot can be readily regulated by means of a petcock 56 in the top of the dash-pot cylinder, and the free upward movement of said piston will be permitted by a check-valve 57, also arranged in the top of the dash-pot cylinder. A portion of the cam 52 marks the arc of a circle concentric to the shaft-section 45, and no movement of the wrist-plate on the shaft 49 results by turning said cam through this arc, which should nearly correspond with the arc during which the pilot-switch 36 is held open by its cam. This provision will insure that no resistance shall be cut out until the main contact has been made and that all the resistance shall be cut in before the main contact has been broken, for the switches controlled by the cams on the shaft 49 are either for short-circuiting resistance or the series coils of the field-winding of the motor. In ordinary practice I use the switches 38, 39, 40, and 41 for short-circuiting resistance and the switch 42 to short-circuit the series field-coils. The cams 27$^b$ on the shaft 49 are therefore arranged so that the switches are all open when the roller 51 rests on the circular arc of the cam 52 and they will close one after the other, beginning with the switch 38, all being closed when the shaft 49 reaches the limit of its travel.

From the construction and arrangement of parts above described it will be seen that the first movement of the section 45 of the two-part shaft by the operator will be to close two of the reversing-switches and then close the pilot-switch. The pilot-switch being now closed, the main switch 37 will be closed and current will flow through all the resistances and through the reversing-switches and motor-windings. After the pilot-switch has been closed a further movement of the shaft-section 45 will cause the cam 52 to ride past the roller 51 on the wrist-plate 50, thus releasing the latter and the shaft 49, which carries it, and permitting the weight of the dash-pot plunger and its rod to rotate said shaft, the downward movement of said plunger and rod, and consequently the speed of rotation of the shaft 49, being retarded and to an extent controlled by the adjustment of the petcock on the dash-pot cylinder. As the shaft 49 rotates the switches 38, 39, 40, and 41 will be operated successively to gradually short-circuit resistance, and after all the resistance has been short-circuited the switch 42 will close and thus short-circuit the series coils of the field-windings of the motor to increase the speed of the latter. A reverse movement of the shaft-section 45 will operate to rotate the shaft 49 through the medium of the cam 52 and wrist-plate 50 to throw in the series field-winding of the motor and then successively open the switches 41 to 38 to throw in the resistance. A further movement of the shaft-section 45 will result in opening the pilot-switch 36 and the consequent deënergizing of the solenoid which controls the main switch 37. The circuit through the apparatus is now open. The operator may now continue to turn the shaft-section 45 in the same direction, which will result in first opening one pair of reversing-switches and closing the other pair and then closing the pilot-switch. The effect of these operations will be to reverse the motor after having cut in the resistance, and this without movement of the reversing-switches while they carried current. After the motor has been thus reversed the cutting out of the resistance and the series field-winding of the motor will be permitted by a further movement of the shaft-section 45 in the manner before explained.

I have hereinbefore referred to a main switch under the control of the pilot-switch for opening and closing the main circuit through the apparatus. This main switch will now be described in detail.

A U-shaped frame 59, having a flat back, is secured to the board 6, as shown in Fig. 1. A thin brass tube or bushing 60 is driven into this frame and surrounded by a solenoid-helix 61, comprising an appropriate number of turns of proper-sized insulated wire, according to the voltage to be used. To make the magnetic circuit more complete, I prefer to cover the top of the tube 60 with an iron plate 62. The soft-iron core 63 of the solenoid is fitted to slide freely in the tube 60 and carries at its lower end a cross-head 64. Near its ends the cross-head is perforated for the accommodation of socket-pieces 65, electrically separated from said cross-head by means of insulating material 66. The shank 67 of a contact-piece 68 passes through each socket-piece and through a hole in the bottom of the latter, and between said contact-piece and the bottom of each socket-piece a coiled spring 69 is located. The lower end of each shank 67 is threaded for the reception of a nut 70, which normally bears against the bottom of the socket-piece and a connector 71. The lower outwardly-projecting arm of the frame 59 is perforated near each end for the passage of stems 72, each carrying at its lower end a holder 73, and each holder and its stem are electrically separated from the frame by means of insulating material 74. A connector 75 is placed on each stem 72 and insulated from the frame 59, and the connector 75, stem 72, and holder 73 are secured in place by means of a nut 76. The holders 73 have carbon contact-blocks 77 secured therein by set-screws 78 and are located immediately over the metal contact-pieces 68. The mechanism of the switch 37 is so proportioned and arranged that when the solenoid is excited by the closing of the pilot-switch 36 the rising of the core 63 will force the metal contact-pieces 65 against the carbon blocks 77 and close the main circuit, at the same time slightly compressing the springs 69, so that the jam-nuts 70 will be forced away from their bearing against the under faces of the socket-pieces 65, thus giving an even bearing on each side of the switch. The springs 69 also serve to start the core 63 downwardly when the excitation of the helix of the solenoid ceases, and thus prevent the core from sticking on account of residual magnetism or from other cause. The core and its cross-head are prevented from turning and are limited as to the distance they may fall by means of two rods 78, which pass through holes in the cross-head, and provided on their lower end with adjustable cushions 79, held in place by nuts 80, as shown in Fig. 6.

Blow-out magnets 81 will preferably be used to disrupt any arc which might be formed between the contacts of the switch 37. These blow-out magnets might be arranged in various ways; but I prefer the construction shown in Fig. 7, wherein two core-pieces 82 83 are shown projecting through the board 6 and secured in place by set-screws 84. The core-pieces are connected by a flat iron plate secured at their ends to them, and a helix 84 is located on one of the core-pieces.

I prefer to provide the apparatus with an ordinary knife-edge switch 85 at the leading-in terminals, such a switch being attached to the board 6, as shown in Fig. 1, and having its pivoted arms electrically connected with other parts of the apparatus, as hereinafter more fully explained, the stationary contacts of said switch having the leading-in line-wires 86 87 connected with them.

In order that the circuit of the solenoid controlling the main switch 37 shall be automatically opened when for any reason the current in the main line fails, as upon the blowing of a fuse, the stopping of the generator, or opening of the switch 85, I provide the switch 88, which I term a "no-voltage switch." This switch comprises a magnet 89, similar in all respects to the blow-out magnet above described and shown in Fig. 7, and a rocking arm 90, having a weight $90^a$ and carrying a contact-point 91, adapted to engage a contact-piece 92, secured to the board 6. This magnet is excited by the current in a shunt-circuit, the terminals of which are connected with the pivoted arms of the switch 85 by means of conductors 93, as shown most clearly in the diagram Fig. 11. With such arrangement the magnet 89 will retain the switch 88 closed when the switch 85 is closed and conditions of the main line are normal. It is apparent, however, that if the switch 88 be opened or should a fuse blow out at any point between the switch 88 and the generator or should the current in the main line fail by the stopping of the generator or from other cause, the magnet of the switch 88 would be immediately deënergized and release the rocking arm 90. The weight $90^a$ would then cause said arm to drop until a toe 94 at the lower end thereof strikes the board 6 and resulting in separating the contacts 91 92. These contacts are included in the same circuit which includes the solenoid-helix of the main switch and the pilot-switch, so that when the switch 88 is opened, as above described, the controlling-solenoid of the main switch will be deënergized and the said main switch permitted to open. As the switch 88 is also included in the same circuit with the pilot-switch which controls the solenoid of the main switch, the apparatus cannot be operated to start the motor as long as the switch 88 is open. Failure of current in the main line from any of the causes above mentioned might occur when the motor is running at full speed and all the resistance cut out of circuit. In such case it would result disastrously, especially to the motor-windings, should the main circuit be again closed while the resistance to all cut out, and hence it is a matter of importance that the switches of the controller be brought to normal starting position before current is permitted to enter the motor, and to insure the resetting of the switches by the operator before attempting to again start the motor I provide means for locking the switch 88 open and to so construct and arrange said locking means that the said switch 88 cannot be closed by the operator until he has first brought the switches on the board 5 and their operating devices to normal starting position. These locking means will now be described in detail.

The rocking arm 90, above referred to, is secured to one end of a shaft 95, revolubly mounted between its ends in a bracket 96, secured to the board 6. The other end of this shaft carries a housing 97, in which a latch 98 is mounted to move, said latch being provided with a stem 99, projecting upwardly through the housing and through a hole in the upper end thereof and provided with a pin 100 to limit the downward movement of the latch. The depending head of the latch is beveled and is retained normally in and forced to the lower end of its throw by means of a coiled spring 101, located in the housing 97. The shaft 49, which carries the cams for operating the rheostat-switches, terminates in proximity to the latch 98, and on the end of this shaft a disk 102, having a beveled periphery and a notch 103, is secured. When the switches on the board 5 are in their normal "starting" positions, the disk 102 on the shaft 49 will be in such position that its notch 103 will be in alinement with the latch 98; but this latch will be removed laterally from the disk when the switch 88 is closed, as shown in Fig. 10. Suppose now that the main circuit should be opened by failure of the current, as above explained, and the switches on the board 5 are in the positions which they would assume when the motor is running at full speed. In such case the switch 88 would be opened, as before explained, and the movement of the rocking arm of said switch would cause the shaft 95 to turn. As the shaft 95 thus turns, the beveled end of the latch 98, engaging the beveled periphery of the disk 102, will cause the latch to ride over the periphery of the disk and become disposed alongside the opposite face thereof, thus locking the switch 88 open. The controller cannot now be operated to start the motor, nor will the closing of the main circuit by the repair of a blown fuse or the restarting of the generator operate to supply current to the motor. The only way in which the switch 88 can be unlocked is to bring the disk 102 to such position as to aline the notch 103 therein with the latch 98, and this cannot be accomplished without bringing all the switches on the board 5 and their operating devices to their normal starting position with all the rheostat-switches open. Thus to start the motor after the current fails in the main circuit while the resistance is cut out the operator must first bring the switches on the board 5 to their normal positions, after which he will be permitted to close the no-voltage switch 88.

It is desirable also to open the circuit through the apparatus and to the motor when the current for any reason becomes excessive and to prevent the restarting of the motor until the switches shall have been brought back to their normal starting positions. For these purposes I employ what I term an "overload-switch" 104. This switch comprises a magnet 105 of the same construction as that of the magnet 89, a rocking switch-arm 106, carrying a contact-point 107, and a contact-piece 108, secured to the board 6. The contacts of this switch are maintained normally together by a weight 109, adjustably mounted on an arm 110, projecting from the rocking switch-arm 106. The rocking arm 106 is carried by a rock-shaft 111, and this shaft carries a latch 112, which is the same in construction and coöperates with the disk 102 in the same manner as has been already fully explained in connection with the latch of the no-voltage switch, the disk 102 being provided with a notch 113 for the accommodation of the latch 112. The magnet of the overload-switch is included in circuit with the main switch, so that should the rise of current passing to motor become excessive the magnet of the overload-switch will become sufficiently strong to attract its armature and open said switch, thus causing the circuit to the motor to be opened. The switch 104 will be locked open in the same manner as above explained in connection with switch 88 and can only be closed after the switches on the board 5 have been brought to their normal positions, as will be readily understood.

It remains now to explain more in detail the paths of the several circuits traversing the apparatus, as shown in the diagram Fig. 11. The knife-edge switch 85 being closed, the closing of the pilot-switch will establish a circuit as follows: from one of the pivoted arms of this switch by a conductor 114 through the no-voltage switch 88, then by conductor 115 through overload-switch 104, then by wire 116 to and through the pilot-switch 36, then by wire 117 to and through the solenoid-helix of the main switch 37, and from said helix by conductor 118 to the other side of the knife-edge switch 85, thus completing the circuit. The solenoid being energized by the passage of current through the circuit above described, the contacts of the main switch will be promptly closed and establish a circuit as follows: from one side of the switch 85 by wire 119 to and through one pair of contacts of the main switch 37, then by wire 120 to and through the magnet-coil of overload-switch 104, then by wire 121 to and through the several coils of resistance-wire, then by wire 122 to and through the series field-coils of the motor, then by wire 123 to one of the contact-switches, (say the switch 28,) then by wire 33 to one of the commutator-brushes of the armature through the armature-windings, and then by wire 35 to another of the reversing-switches, (say the switch 29,) then by a wire 126 to and through the other contacts of the main switch 37, and finally by conductor 127 to the other or minus side of the switch 85. There will also be established two shunt-circuits—namely, one through the magnet-coil of the no-voltage switch, which has already been described, and the other through the shunt field-winding of the motor and the blow-out magnets. This shunt-circuit may be readily traced as follows: from the conductor 121 by wire 128 to and through the shunt field-coils 4 of the motor and then by wire 129 to one of the contacts of the main switch 37, the circuit of this wire also including the coils of the blow-out magnets, as clearly shown by the diagram. One side of each of the switches 38, 39, 40, and 41 is connected with conductor 121, while the other sides of the switches 38, 39, and 40 are connected at different points with the resistance-coils and the other side of the switch 41 is connected with the wire 122, so that as the switches 38 to 41 close one after the other the resistance will be gradually short-circuited, as will be readily understood. One side of the switch 42 is also connected with the wire 121, while the other side of said switch is connected with one side of one of the reversing-switches—for instance, with the switch 31—for the purpose of short-circuiting the series coils of the motor field-winding when the switch is closed. As before explained, the switch 42 will be closed after all the resistance shall have been short-circuited, and when said switch 42 has been closed the main circuit will be slightly changed from that above described—that is to say, the current instead of traversing the conductor 122 will after passing from the conductor 121 through the switch 42 follow a circuit of lower resistance by wire 130 to one of the reversing-switches, thus short-circuiting the series coils of the motor-winding and causing the rotation of the armature to be increased.

It has been hereinbefore explained how the no-voltage switch will be automatically opened if the current on the main line fails from any cause and how the switch will be locked open while the mechanism is in any but its normal starting position. It has also been explained how the overload-switch will be opened and locked open should the current to the motor become excessive. Now it will be observed that when the shaft 45 has been moved to its normal starting position and the notches 103 of the disk 102 shall have been brought into alinement with the latches 98 and 112 the no-voltage switch 88 and the overload-switch 104 will be unlocked. As soon as the overload-switch has been thus unlocked the weighted arm 110 thereon will operate to move said switch and close its contacts. The no-voltage switch will remain unlocked and open until the circuit through the apparatus shall have been closed—as, for instance, by closing switch 85—and as soon as this occurs the magnet of the no-voltage switch will be energized and operate automatically to close the said no-voltage switch. Thus it will be seen that should either of the said switches be opened during the operation of the motor they will be locked open and afterward automatically released and closed after the rheostat and reversing switches shall have been mechanically moved to normal starting position.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In an electrical controller, the combination with a series of switches constituting a reversing-switch, and a circuit-closing switch, of a shaft comprising two sections, cams carried by one of said sections and arranged to operate the reversing-switches in pairs, a cam carried by the other shaft-section for operating the circuit-closing switch, and a lost-motion device connecting said shaft-sections.

2. In an electrical controller, the combination with a series of switches constituting a reversing-switch, and a circuit-closing switch, of a shaft comprising two sections, cams carried by one of said sections and arranged to operate the reversing-switches in pairs, a cam carried by the other shaft-section and arranged to operate the circuit-closing switch, a sleeve having an elongated slot, secured to one of said shaft-sections and having the other shaft-section mounted to turn therein, and a pin secured to said last-mentioned shaft-section and arranged to move in the elongated slot in the sleeve.

3. In an electrical controller, the combination of a series of switches constituting a reversing-switch, each of said switches comprising a pivoted arm, a metallic contact-piece carried by said arm, a movable holder and a carbon contact-piece carried by said holder, a spring normally tending to press the metallic contact-piece toward the carbon contact-piece, and means for operating said switches in pairs.

4. The combination in an electrical controller, of a pivoted switch-arm, a spring normally tending to press said arm in one direction, means for moving the arm in the reverse direction, a contact-piece carried by one end of said arm, a holder mounted to rock and a carbon contact-block carried by said holder.

5. The combination in an electrical controller, of a bracket, an arm or lever pivoted between its ends in said bracket, a contact-piece secured to one end of said arm, a fixed rod passing freely through a hole in said arm, a spring encircling said rod and bearing against said arm, a nut on the rod for adjusting said spring, a carbon contact-block, a roller mounted in one end of said arm and a cam engaging said roller for controlling the movements of said arm.

6. The combination in an electrical controller, of a pivoted switch arm or lever, a contact-piece carried by one end of said arm or lever, a fixed socket-piece, a holder having a ball-and-socket connection with said socket-piece, a carbon contact-block secured in said holder, a spring for moving the arm or lever in one direction to bring the contacts together and means for controlling the movements of said arm or lever.

7. The combination in an electrical controller, of a switch comprising a bracket, an arm pivoted between its ends in said bracket, a rod secured to the bracket and passing freely through a hole in the arm, a spring on said rod and bearing against the arm, a nut on the rod, against which the other end of the spring bears, a contact-plate secured to one end of said arm, a holder, a carbon contact-block secured in said holder, a spherical enlargement projecting from said holder, a socket-piece having a similarly-shaped socket for the reception of said enlargement, a shank on said socket-piece, a nut on said shank said shank, socket-piece, holder and its spherical enlargement having alined perforations and a conductor passing through said alined perforations.

8. In an electrical controller, the combination with a manually-operated reversing-switch, and an electrically-operated main switch, of a pilot-switch for controlling the electrical operating means of the main switch.

9. In an electrical controller, the combination with a manually-operated reversing-switch and an electrically-operated main switch, of a pilot-switch for controlling the electrical operating means of the main switch, and means for mechanically operating the reversing-switch and said pilot-switch.

10. In an electrical controller, the combination with a series of switches constituting a reversing-switch, a main electrically-operated switch and a pilot-switch included in circuit with the electrically-operated means of the main switch, of a shaft comprising two sections, cams carried by one section for operating the reversing-switches in pairs, and a cam carried by the other section of the shaft for operating the pilot-switch, and a lost-motion device between the shaft-sections, whereby the reversing-switches will be manually closed before the pilot-switch is closed and so that the pilot-switch will be opened before any of the reversing-switches are opened.

11. In an electrical controller, the combination with a main electrically-operated switch, a manually-operated reversing-switch and a rheostat-switch, of a pilot-switch for controlling the circuit of the electrically-operated means of the main switch, and mechanical devices constructed and adapted to first close the reversing-switch, then the pilot-switch and then the switches of the rheostat.

12. In an electrical controller, the combination with a series of resistance-coils and a series of normally open switches for short-circuiting the same, of means for releasing said switches, and means for automatically closing said switches gradually and successively.

13. In an electrical controller, the combination with a series of resistance-coils and a series of spring-pressed switches for short-circuiting the same, of a shaft, cams secured to said shaft for normally retaining all of said switches open, said cams so relatively arranged as to release the switches successively, means for releasing said shaft, and means for rotating it.

14. In an electrical controller, the combination with a series of resistance-coils and a series of spring-pressed switches for short-circuiting the same, of a shaft, cams secured to said shaft and relatively arranged to successively release said switches, a wrist-plate secured to said shaft, a cam for normally preventing movement of said wrist-plate and for releasing it and means for turning the shaft when the wrist-plate shall have been released by the cam.

15. In an electrical controller, the combination with a series of spring-pressed rheostat-switches, a reversing-switch and a circuit-controlling switch, of a shaft, cams on the shaft relatively arranged to successively release the rheostat-switches, a second shaft comprising two sections, cams secured to one of said sections for operating the reversing-switch, a cam on the other section for operating the circuit-controlling switch, a lost-motion connection between said shaft-sections, and devices between one of said shaft-sections and the first-mentioned shaft for releasing the latter.

16. In an electrical controller, the combination with a series of rheostat-switches, a shaft carrying cams for operating said switches successively, a wrist-plate secured to said shaft, of a reversing-switch, a circuit-controlling switch, a shaft comprising two sections, a lost-motion connection between said sections, cams secured to one of said sections for operating the reversing-switch, a cam carried by the other section for operating the circuit-controlling switch, another cam carried by the last-mentioned shaft-section and engaging the wrist-plate on the first-mentioned shaft, said last-mentioned cam constructed and arranged to release the wrist-plate after the circuit-controlling switch has been closed and means for rotating the first-mentioned shaft when thus released.

17. In an electrical controller, the combination with a series of spring-pressed rheostat-switches, of a shaft, a series of cams secured to said shaft and relatively arranged to release said switches successively, means for closing the circuit through the rheostat, a wrist-plate on said shaft, means for releasing the wrist-plate and shaft after the circuit has been closed, a dash-pot cylinder provided with a petcock and a check-valve, and a plunger in said cylinder connected with said wrist-plate.

18. The combination with an electric motor having a series and a shunt field-winding, of a rheostat, a series of switches therefor, a reversing-switch, a switch arranged in a short circuit around the series coil of the field-magnet winding, and means for closing the reversing-switches successively and then closing said short-circuiting switch.

19. The combination in a controller for electric motors, of a main electrically-operated switch, a normally closed "no-voltage" switch included in a circuit of the controller with the electrically-operated means of the main switch and electromagnetic means for maintaining said "no-voltage" switch normally closed, said last-mentioned electromagnetic means included in a shunt from the main circuit.

20. The combination in an electric controller, of an electrically-operated main switch, a pilot-switch included in circuit with the electrically-operated means of the main switch, a normally closed "no-voltage" switch included in circuit with the pilot-switch, and an electromagnet for controlling said "no-voltage" switch included in a shunt-circuit.

21. The combination with an electric controller, of a normally closed switch included in a controlling-circuit of the apparatus, electrically-actuated means for releasing said switch upon failure of current on the main line, and means for locking the switch open.

22. The combination with an electrical controller, of a normally closed switch included in a controlling-circuit of the apparatus, electrically-actuated means for releasing said switch upon failure of current on the main line, and means for locking the switch open.

23. The combination in an electrical controller, of a main switch, electrically-actuated means for operating said switch, a normally closed switch included in circuit with the electrically-operated means of the main switch, electrically-operated means for releasing said normally closed switch upon failure of current on the main line, and means for locking the normally closed switch open.

24. The combination with an electric controller, of a normally closed switch in a controlling-circuit of the apparatus, electrically-actuated means in the main circuit constructed and adapted to permit said switch to open when there is an abnormal rise of current in the main circuit, and means for locking said switch open.

25. The combination with an electric controller, of a main switch, a pilot-switch for controlling the main switch, a "no-voltage" switch and an "overload-switch" in circuit with the pilot-switch, electrically-controlled means in a shunt-circuit for controlling the "no-voltage" switch and electrically-operated means in the main circuit for controlling the "overload-switch."

26. The combination with an electric controller, of a main switch, a pilot-switch for controlling the main switch, a "no-voltage" switch and an "overload-switch" included in circuit with the pilot-switch, electrically-controlled means for the "no-voltage" switch included in a shunt-circuit, electrically-controlled means for the "overload-switch" included in the main circuit, and locking devices for said "no-voltage" and "overload" switches.

27. In an electrical controller, the combination with a rheostat-switch and a shaft carrying means for operating the same, of a no-voltage switch included in a controlling-circuit of the apparatus, electrically-actuated means for controlling said switch, a notched disk on the shaft of the rheostat-switch and a latch carried by the "no-voltage" switch and adapted to coöperate with said notched disk to lock said "no-voltage" switch open.

28. In an electric controller, the combination with a rheostat-switch, a shaft carrying means for operating said switch, a "no-voltage" switch and electrical means for controlling the latter, of a notched disk on said shaft, a shaft projecting from the "no-voltage" switch, and a latch carried by said shaft and adapted to coöperate with the disk on the rheostat-switch-operating shaft for locking said "no-voltage" switch open.

29. In an electrical controller, the combination with a rheostat-switch, a shaft carrying means for operating said switch and a notched disk secured to said shaft, of a rock-shaft, a switch-arm secured to one end of said shaft, two contacts, one of which is carried by the switch-arm, an electromagnet included in a controlling-circuit of the apparatus for controlling the movement of the switch-arm, a housing secured to the other end of said rock-shaft, and a spring-actuated latch carried by said housing and arranged to coöperate with the notched disk to lock said switch-arm with the contacts separated.

30. The combination with an electric controller, of a "no-voltage" switch, means for locking said switch open, means for releasing said switch, and electrically-actuated means for controlling the opening and for closing of said switch.

31. The combination with an electric controller, of a "no-voltage" switch, means for locking the switch open, means for releasing the switch from locked position, and an electrically-actuated device operating to maintain said switch normally closed and to close it automatically after it has been released from the locking means.

32. The combination with an electric controller, of a normally closed "no-voltage" switch, a normally closed "overload-switch," means for locking said switches open, and means operating to automatically close said switches when they shall have been unlocked.

In testimony whereof I have signed this specification in the presence of two subscribing witnesses.

WILLIAM K. LIGGETT.

Witnesses:
W. T. GUY,
W. G. McPECK.